United States Patent [19]
Usuki et al.

[11] Patent Number: 5,973,053
[45] Date of Patent: Oct. 26, 1999

[54] COMPOSITE CLAY MATERIAL AND METHOD FOR PRODUCING THE SAME, BLEND MATERIAL AND COMPOSITE CLAY RUBBER USING THE SAME AND PRODUCTION METHOD THEREOF

[75] Inventors: Arimitsu Usuki; Makoto Kato; Akane Okada, all of Aichi-ken, Japan

[73] Assignee: Kabushiki Kaisha Toyota Chuo Kenkyusho, Aichi-ken, Japan

[21] Appl. No.: 08/656,864

[22] Filed: May 30, 1996

[30] Foreign Application Priority Data

| Jun. 5, 1995 | [JP] | Japan | 7-163016 |
| Jun. 30, 1995 | [JP] | Japan | 7-188648 |
| Jul. 14, 1995 | [JP] | Japan | 7-201592 |

[51] Int. Cl.$^6$ .............. C08J 5/10; C08K 3/34; C08L 23/00
[52] U.S. Cl. .............. 524/445; 523/216; 524/447; 524/448; 524/449; 524/450; 524/451; 524/714; 524/718
[58] Field of Search .............. 523/200, 216; 524/445, 447, 448, 450, 451, 789, 791, 714, 718, 736, 739, 879, 449

[56] References Cited

U.S. PATENT DOCUMENTS

| 4,739,007 | 4/1988 | Okada et al. | 524/789 |
| 4,774,284 | 9/1988 | Iwasa | 525/57 |
| 4,810,734 | 3/1989 | Kawasumi et al. | 523/216 |
| 4,889,885 | 12/1989 | Usuki et al. | 524/445 |
| 4,894,411 | 1/1990 | Okada et al. | 524/710 |
| 5,164,460 | 11/1992 | Yano et al. | 524/445 |

FOREIGN PATENT DOCUMENTS

| 36 32 865 | 4/1987 | Germany . |
| 38 06 548 | 9/1988 | Germany . |
| 38 10 006 | 10/1988 | Germany . |

OTHER PUBLICATIONS

Database WPI, Derwent Publications, AN–78–78801A, JP–A–53 109 545, Sep. 25, 1978.
Chemical Abstracts, vol. 115, No. 24, Dec. 16, 1991, AN 259248v, Yoshiyuki Sugahara, et al.
Chemical Abstracts, vol. 114, No. 24, Jun. 17, 1991, AN 229968s, Eduardo Ruiz–Hitzky, et al.

*Primary Examiner*—James J. Seidleck
*Assistant Examiner*—U. K. Rajguru
*Attorney, Agent, or Firm*—Oblon, Spivak, McClelland, Maier & Neustadt, P.C.

[57] ABSTRACT

A composite clay material with the interlayer distance sufficiently expanded by dispersing clay mineral in a low polar polymer on a molecular level and the method for producing the same, blend material and composite clay rubber material using the same and the production method thereof.

The composite clay material is formed of a clay mineral rendered compatible with an organic material through ionic bonding to an organic onium ion having 6 or more carbon number and a main guest molecule having a polar group in its main chain and side chain and molecular length equal to or larger than that of said organic onium ion. The main guest molecule is incorporated at least partially into an interlayer section of the clay mineral which has a hydrogen bonding with the polar group of the main guest molecule. The main guest molecule preferably has a molecular weight ranging from about 100 to 100000. Alternatively a first guest molecule having a polar group and molecular length equal to or smaller than that of the organic onium ion and a second guest molecule having no polar group therein and molecular length larger than that of the organic onium ion are incorporated into the interlayer section of the clay mineral instead of the main guest molecule. The above obtained clay composite material may be mixed with the rubber material.

18 Claims, 3 Drawing Sheets

COMPOSITE CLAY MATERIAL AND METHOD FOR PRODUCING THE SAME, BLEND MATERIAL AND COMPOSITE CLAY RUBBER USING THE SAME AND PRODUCTION METHOD THEREOF

BACKGROUND OF THE INVENTION

1. Field of the Invention

This invention relates to a composite clay material and, more particularly, to the one in which a clay mineral is dispersed in substantially a low polar polymer on the molecular level and a method for producing the composite clay material, as well as a blend material and a composite clay rubber material using the same and production methods thereof.

2. Description of the Related Arts

It has been conventionally studied on adding and kneading a clay mineral to an organic polymer material in order to improve mechanical properties thereof. For example, Japanese Laid-Open Patent Publication No. 74957/1987 or No. 198645/1989 discloses a method for dispersing the clay mineral into thermosetting high polymer such as nylon, vinyl high polymer and epoxy or rubber material. According to the related arts, the following methods are used to disperse the clay mineral; rendering the clay mineral compatible with an organic material by using an organic onium ion to start monomer polymerization between layers of the clay mineral; combining the clay mineral with a growth seed; and inserting a polymerized material between interlayer sections of a clay mineral by kneading them together.

When producing the conventional composite clay material, the clay mineral incompatible with a non-polar polymer hardly accommodates such a non-polar polymer in its interlayer section nor allows its layers expand to accept such a polymer. Therefore it has been difficult to uniformly disperse the clay mineral in the non-polar polymer.

Japanese Laid-Open Patent Publication No. 198645/1989 provides the solution to the aforementioned difficulty. Referring to FIG. 5, an onium ion 960 is incorporated into an end of a chain or a side chain of the polyolefine, the non-polar polymer. The olefin polymer is modified to polymer 96 to render a clay mineral 97 compatible with an organic material.

However incorporation of the onium group into the polyolefine end is chemically difficult in the related art. Additionally since the polyolefine has been inserted into the interlayer section of the clay mineral only at a single stage, the expansion of interlayer distance has not been sufficient in the related art.

In another related art introduced in "Chem. Mater. 5, 1694–1696/1993" written by E. P. Giannelis, et.al., when using polystyrene having no polar group at the main chain or the side chain, only a single layer of polystyrene molecules is allowed to enter between layers, thus the expansion of the interlayer section being limited.

SUMMARY OF THE INVENTION

It is an object of the present invention to provide a composite clay material containing a clay mineral sufficiently expanded with a large distance between layers thereof by uniformly dispersing the clay mineral into a low polar polymer on the molecular level, and a method for producing such material, as well as a blend material and a composite clay rubber material using the same and the method for producing those materials.

A first aspect of the present invention provides a composite clay material which is formed of a clay mineral having an interlayer section; an onium ion having 6 or more carbon atoms, bonding to the clay mineral via an ionic bond for expanding the interlayer section and rendering the interlayer section compatible with an organic molecule; and a main guest molecule as the organic molecule having a polar group in a main chain and/or a side chain thereof, being at least partially incorporated into the expanded interlayer section and bonded to the clay mineral through a hydrogen bonding between the clay mineral and the polar group. The main guest molecule has a molecular length equal to or larger than that of the organic onium ion. The main guest molecule remains in the interlayer section of the clay mineral without being eliminated due to the polarity, thereby allowing the interlayer distance to expand sufficiently.

A second aspect of the present invention provides a composite clay material which is formed of a clay mineral having an interlayer section; an onium ion having 6 or more carbon atoms, bonding to the clay mineral via an ionic bond for expanding the interlayer section and rendering the interlayer section compatible with an organic molecule; a first guest molecule as the organic molecule having a polar group therein, being at least partially incorporated into the expanded interlayer section and bonded to the clay mineral through a hydrogen bonding between the clay mineral and the polar group; and a second guest molecule without a polar group as the organic molecule being at least partially incorporated into the expanded interlayer section. The first guest molecule has a molecular length equal to or smaller than that of the organic onium ion. The second guest molecule has a molecular length equal to or larger than that of the organic onium ion.

The composite clay material of the first aspect incorporates the main guest molecule having the polar group into the interlayer section of the clay mineral. The composite clay material of the second aspect is different from the first aspect in that the first guest molecule having the polar group that can be hydrogen bonded to the clay mineral and the second guest molecule having no polar group are incorporated into the interlayer section. The clay mineral surface is caused to be hydrophobic through hydrogen bonding to the first guest molecule. The interlayer section of the hydrophobic clay mineral accommodates the second guest molecule, thus sufficiently expanding the interlayer distance of the clay mineral.

A third aspect of the present invention provides a composite clay rubber material which is formed of at least one material selected from the group consisting of a first composite clay material; a second composite clay material; and a rubber material. The first composite clay material is formed of a clay mineral having an interlayer section; an onium ion having 6 or more carbon atoms which bonds to the clay mineral via an ionic bond for expanding the interlayer section and renders the interlayer section compatible with an organic molecule; a first guest molecule as the organic molecule having a polar group therein which is at least partially incorporated into the expanded interlayer section and bonded to the clay mineral through a hydrogen bonding between the clay mineral and the polar group; and a second guest molecule without a polar group as the organic molecule which is at least partially incorporated into the expanded interlayer section,. The first guest molecule has a molecular length equal to or smaller than that of the organic onium ion. The second guest molecule has a molecular length equal to or larger than that of the organic onium ion. The second composite clay material is formed of a clay mineral having an interlayer section; an onium ion having 6 or more carbon atoms which bonds to the clay mineral via an ionic bond for expanding the interlayer section and renders the interlayer section compatible with an organic molecule; and a main guest molecule as the organic molecule having a polar group in a main chain and/or a side chain thereof being at least partially incorporated into the expanded interlayer section and bonded to the clay mineral through a hydrogen bonding between the clay mineral and the polar group. The main guest molecule has a molecular length equal to or larger than that of the organic onium ion, in which at least one of the second guest molecule and the main guest molecule is crosslinked with a molecule of the rubber material.

The rubber material is kneaded with the composite clay material of the first aspect or the second aspect. Since the clay mineral contained in the above-prepared composite clay material is expandable sufficiently, it can be dispersed uniformly within the rubber material on a molecular level without causing coagulation.

Further scope of applicability of the present invention will become apparent from the detailed description given hereinafter. However, it should be understood that the detailed description and specific examples, while indicating preferred examples of the invention, are given by way of illustration only, since various changes and modifications within the spirit and scope of the invention will become apparent to those skilled in the art from this detailed description.

BRIEF DESCRIPTION OF THE DRAWINGS

This and other objects, features and advantages of the present invention will become more apparent upon a reading of the following detailed description and drawings, in which.

DETAILED DESCRIPTION OF THE INVENTION

The most important feature of the first aspect of the present invention is to incorporate a main guest molecule having a polar group that can be hydrogen bonded into a section between layers of the clay mineral ionic bonded to the organic onium ions.

Figure 1A:
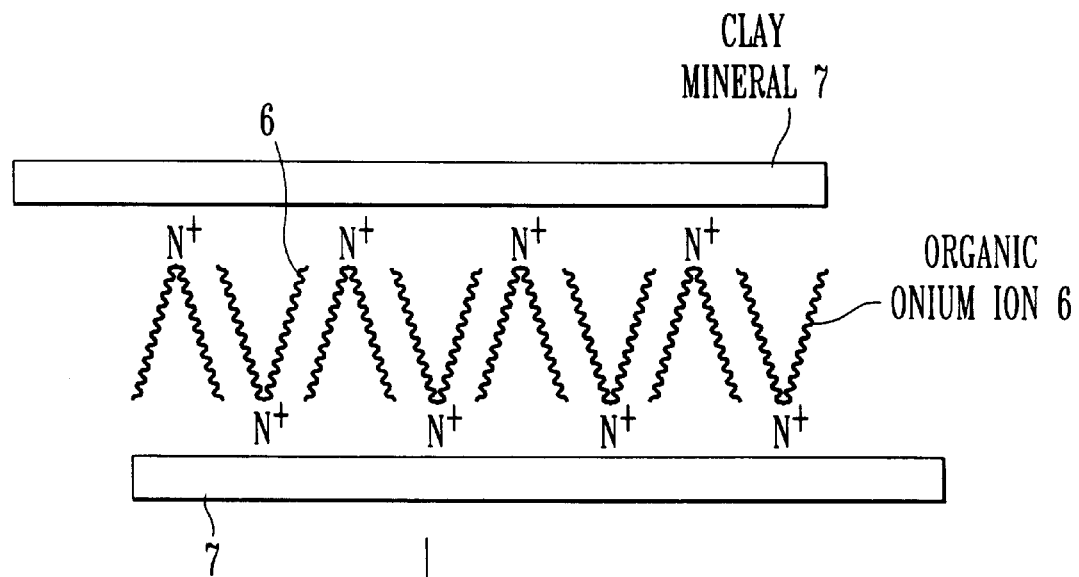
FIG. 1A is a schematic view showing a function of a conventional composite clay material.
Figure 1B:
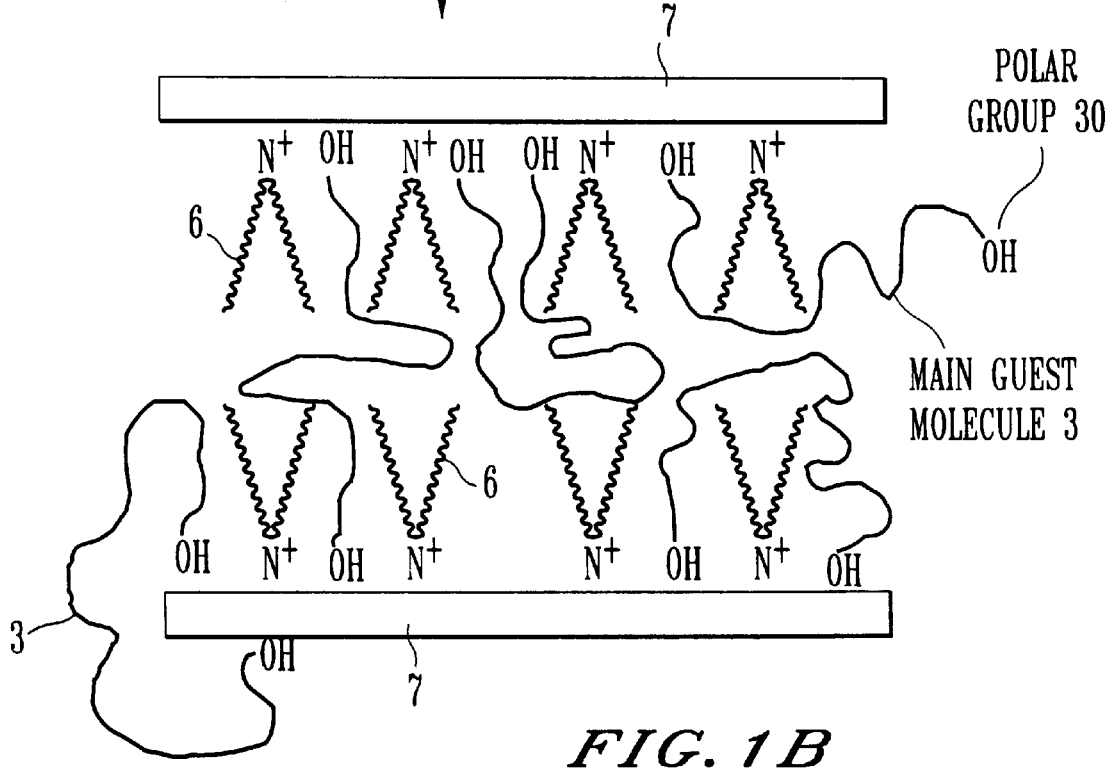
FIG. 1B is a schematic view showing a function of composite clay material of the first aspect of the present invention.

Referring to FIG. 1B, in the composite clay material of the first aspect, a main guest molecule 3 having a polar group 30 is incorporated between layers of clay mineral 7. The incorporated main guest molecule 3 is hydrogen bonded to a silicate group of the clay mineral 7. As a result, the main guest molecule 3 is not eliminated due to polarity of the clay mineral 7 but remains in the interlayer section thereof. The guest molecule 3 having a molecular length equal to or larger than that of the organic onium ion expands the interlayer distance of the clay mineral 7.

In a conventional composite clay material using no main guest molecule, as FIG. 1A shows, the clay mineral 7 is only ionic bonded with the organic onium ion 6. The organic onium ion 6 is arranged to have a predetermined space for accommodating the main guest molecule in the interlayer section of the clay mineral 7. The layer of the clay mineral 7 has a hydrophilic silicate framework, which is incompatible with the main guest molecule. As a result, the incorporated guest molecule is eliminated. Additionally the interlayer section accommodates only one layer of the organic onium ion, thus limiting the expansion of the clay mineral.

The interlayer section expands with increase in amount of the incorporated main guest molecule.(See Table 2). Since the presence of the main guest molecule expands the interlayer section of the clay mineral limitlessly, each clay mineral can be uniformly dispersed on a molecular level even in the matrix of the main guest molecule without causing aggregation.

As the clay mineral has expanded limitlessly, its surface area is substantially increased compared with the case where the expansion is limited. The clay mineral thus expanded improves imperviousness of the element to gas or liquid (water, oil or the like).

The presence of the clay mineral restricts the main guest molecule's motion. Then entanglement of the main guest molecule chain (matrix molecular chain) becomes too tight to be loosened, thus improving the tensile strength of the element, mechanical strength such as elasticity modulus and creep resistance.

The aforementioned composite clay material is described in detail.

The composite clay mineral is organized through ionic bonding to organic onium ion having 6 or more carbon number.

In case the organic onium ion has less than 6 carbon number, its hydrophilic property is improved but its compatibility with the main guest molecule is deteriorated. As the organic onium ion, the following ions may be used: ammonium ion : hexylammonium ion, octylammonium ion, 2-ethyl-hexylammonium ion, dodecylammonium ion, octadecylammonium ion, oleylammonium ion, dioctyldimethylammonium ion, trioctylammonium ion, distearyldimethylammonium ion, lauric acid ammonium ion or the like; organic sulfonium ion; and organic phosphonium ion. As the organic onium ion, the one with the carbon chain having the molecular length equivalent to the carbon number 30, or the one with the branch carbon chain having the molecular length equivalent to the carbon number 60 may be used.

It is preferable to use the clay mineral having a large surface area to which the main guest molecule contacts, with which interlayer distance of the clay mineral is sufficiently expanded; More specifically, cation exchange capacity of the clay mineral is preferably set to about 50 to 200 milli equivalent weight/100g. If the exchange capacity is less than 50 milli equivalent weight/100g, the onium ion is not sufficiently exchanged, thus failing to expand the interlayer distance of the clay mineral. If the exchange capacity exceeds 200 milli equivalent weight/100g, the bonding strength between the clay mineral layers becomes too high to expand the interlayer distance of the clay mineral.

As the above-described clay mineral, the following mineral may be used:smectyte clay mineral such as montmorillonite, saponite, hectolyte, bydelyte, stevencyte, nontronite; vermiculite, halloysite or mica. Either natural or synthesized clay mineral can be used as far as the exchange capacity is kept in the aforementioned range.

The main guest molecule has at least one polar group at its main chain and/or side chain. The polar group is bonded to an end of the main guest molecule, mid part of the molecular chain, or the side chain. Preferably the polar group is bonded to the end of the main guest molecule so as to further expand the interlayer distance of the clay mineral.

The polar group herein generally used has polarization in electric charge where electrons are localized within the molecule and contains no ion which has been completely polarized. The onium ion is thus not contained in the aforementioned polar group.

The following groups can be used as the polar group as shown in Table 1:hydroxyl group (OH), halogen group (F, Cl, Br, I), carboxyl group(COOH), anhydrous-carboxylic acid group, thiol group (SH), epoxy radical, or amino group as the primary, secondary or tertiary amine (NH2, NH, N).

The polar group of the first aspect of the present invention, of course contains no onium ion.

In the first aspect, it is not preferable to use the group such as imino group, phosponyl group, sulfonyl group or the like, which conforms to the above-described polar group but is polarized to a relatively higher extent. This is because the main guest molecule containing such group has low insolubility to the solvent or insufficient stability at a high temperature when being dissolved, which cannot be easily used in the process for producing the composite clay material.

TABLE 1

POLAR GROUP

| Description | Chemcial formula |
|---|---|
| Hydroxyl group | —OH |
| Halogen group | —F |
| | —Cl |
| | —Br |
| | —I |
| Carboxyl group | —COOH |
| Anhydrous carboxylic acid group | 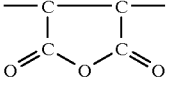 |
| Thiol group | —SH |
| Epoxy group | 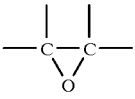 |
| Ether group | —O— |
| Amino group | —NH$_2$ |
| | —NH— |
| | —N— |

The molecular length of the main guest molecule is equal to or larger than that of the organic onium ion. If it is smaller than the molecular length of the organic onium ion, the main guest molecule is prevented from extruding out of the area where the organic onium ion exists on the clay surface. As a result, the clay mineral cannot be dispersed within a matrix.

The main guest molecule is formed as an olefin or paraffin having straight or branch chain construction or an olefin or paraffin having straight or branch chain construction as well as an aromatic ring in the main chain and/or side chain.

The main guest molecule has at least one polar group and saturated or unsaturated straight chain or branch construction. The main guest molecule may further have an aromatic ring in its main chain and/or side chain.

Preferably the above main guest molecule is formed as lauryl alcohol (carbon number: 12), stearyl aryl alcohol (carbon number: 18), oleyl alcohol (carbon number: 18), stearic acid (carbon number: 18), linolic acid (carbon number 18), linolenic acid (carbon number 18), stearyl chloride (carbon number 18) or the like. The main guest molecule may be also formed as polyethylene, polypropylene or polyisoprene, polybutadiene, having a polar group such as OH, COOH, Cl, epoxy or the like, or the one obtained by adding water thereto or copolymerizing them.

Increase in the mixture ratio of the main guest molecule tends to expand the interlayer distance of the clay mineral. It is preferable that the mixture ratio of the main guest molecule is 0.5wt. % or more to 1 wt. % of the organized clay mineral. If the mixture ratio is less than 0.5 wt. %, the resultant expansion of the interlayer distance of the clay mineral becomes insufficient.

It is preferable that molecular weight of the main guest molecule ranges from about 100 to about 100000. If the molecular weight is smaller than 100, the interlayer expansion of the clay mineral becomes insufficient. While if it exceeds 100000, the main guest molecule becomes insoluble to the solvent or its softening point or a melting point may exceed a decomposition point of the clay mineral.

It is preferable that the molecular weight of the main guest molecule ranges from about 500 to about 100000. If it is smaller than 500, the interlayer expansion of the clay mineral becomes insufficient. While if it exceeds 100000, the main guest molecule becomes insoluble to the solvent or its softening point or a melting point may exceed a decomposition point of the clay mineral. The main guest molecule preferably has a molecular length 3 or 4 times that of the organic onium ion or more.

The polar group of the main guest molecule is hydrogen bonded to the clay mineral. At least a part of the main guest molecule is incorporated into a section between layers of the clay mineral. A whole part of the main guest molecule does not have to be incorporated into the interlayer section. Supposing that a polymer having molecular weight of 1000 to 10000 is used as the main guest molecule, incorporating 10 wt. % of the main guest molecule expands the interlayer distance of the clay mineral sufficiently. In case where less than 10 wt. % of the main guest molecule is incorporated, the interlayer expansion of the clay mineral becomes insufficient.

A method for producing the composite clay material of the first aspect includes the steps of: incorporating an organic onium ion into an interlayer section of a clay mineral by making the onium ion contact with the clay mineral and forming an ionic bond therebetween for expanding the interlayer section and rendering the interlayer section compatible with an organic molecule, the organic onium ion having 6 or more carbon atoms;

contacting the rendered interlayer section of the clay mineral with a main guest molecule having a polar group in a main chain or a side chain thereof and a molecular length equal to or larger than that of the organic onium ion, and forming a hydrogen bonding therebetween so that the main guest molecule is at least partially incorporated into the rendered interlayer section of the clay mineral.

The most important feature of the above-described process is that the clay mineral is organized in contact with the organic onium ion and then the organized clay mineral is further contacted with the main guest molecule having a polar group.

The most important feature of this method is that the clay mineral is organized in contact with the organic onium ion. This method forms some space between layers of the clay mineral. The clay mineral is then further contacted with the main guest molecule having the polar group. The interlayer section of the clay mineral is so formed to sufficiently accommodate incorporation of the main guest molecule having a long molecular length. As a result, the interlayer section of the clay mineral will be further expanded by incorporation of the main guest molecule.

The interlayer section of the clay mineral is sufficiently expanded through two stages as described above. As a result, the clay mineral can be uniformly dispersed within a matrix of the main guest molecule.

The polar group which can be hydrogen bonded can be easily incorporated into the main guest molecule. Therefore the composite clay material in which the interlayer space of the clay mineral sufficiently expands can be obtained at a low cost.

In order to contact the clay mineral with the organic onium ion, the clay mineral is dispersed in a water solution containing the organic onium ion and then the clay mineral is washed with water to remove the excessive organic onium ion.

The thus organized clay mineral may be brought into contact with the main guest molecule through two types of methods. One method is executed by putting the clay mineral into a solvent containing the main guest molecule dissolved therein. The other method is executed by putting the clay mineral into softened or melted main guest molecule.

The above-described former method allows the main guest molecule to enter into the interlayer section of the clay mineral at a room temperature. The solvent used in this method may be a non-polar one, such as toluene, benzene, xylene, hexane and octane. It is preferable that 10 to 90 wt. % of the organized clay mineral and the main guest molecule are added to 100% of the solvent. If the total amount of the mixture exceeds 90 wt. %, the clay mineral and the main guest molecule are not sufficiently mixed. If the mixture amount is smaller than 10wt. %, the solvent volatization will take a long time.

According to the latter method, the main guest molecule is heated at a temperature equal to or higher than the softening point or melting point for softening or melting the main guest molecule. However the heating temperature is kept at a predetermined level, for example at 250°0 C. or less for keeping the main guest molecule and the clay mineral stabilized without causing decomposition. In case the heating temperature exceeds 250° C., the organized clay mineral may be decomposed.

It is preferable to set a time for contacting the organized clay mineral with the main guest molecule to 0.1 to 1 hour. If the time is less than 0.1 hour, the interlayer distance of the clay material cannot be expanded. While if the time exceeds one hour, the interlayer distance cannot be expanded more than expected.

The composite clay material of the first aspect can be used for molding material, reinforcement material, filling material or the like as the composite material. This composite clay material may be blended with the synthetic resin other than the organic onium ion or the main guest molecule for providing the blend material of the clay mineral.

The blend material is prepared by using the composite clay material formed of the clay mineral organized through ionic bonding to the organic onium ion having 6 or more carbon number and the main guest molecule having a polar group in the main chain and/or side chain and its molecular length equal to or larger than that of the organic onium ion in which the main guest molecule is at least partially inserted into the interlayer section of the clay mineral so that the clay mineral is bonded via a hydrogen bonding to the polar group of the main guest molecule and synthetic resin material other than the organic onium ion or the main guest molecule used for producing the aforementioned composite clay material. The composite clay material and the synthetic resin were mixed for providing the blend material of the clay mineral.

The interlayer distance of the clay mineral of the blend material is expandable limitlessly. The clay mineral can be uniformly dispersed in the matrix formed of the low- or non-polar resin material. A mechanical characteristic of the resin material is also improved by adding the composite clay material. Various kinds of molding members formed of the blend material have excellent tensile strength, mechanical strength such as elastic modulus and creep resistance. The blend material of the clay mineral can be used as, for example, molding material for injection molding, extrusion molding, press molding or the resin material for paints.

The blend material preferably has an interlayer distance of the clay mineral further expanded in order to disperse the clay mineral within the synthetic resin uniformly.

The synthetic resin may be the same as or different from the organic onium ion or the main guest molecule. The following synthetic resins different from the the organic onium ion or the main guest molecule are useable but not limited thereto:

polyethylene, polypropylene, polystyrene, polyisobutene, acrylic resin, polyurethane, styrene-butadiene block copolymer.

The composite clay material of the second aspect is formed of a clay mineral organized with the organic onium ion having 6 or more carbon number, a first guest molecule having the molecular length equal to or smaller than that of the organic onium ion and the polar group therein hydrogen bonded to the clay mineral, and a second guest molecule having the molecular length larger than that of the organic onium ion and no polar group contained therein.

The first guest molecule and the second guest molecule are contained in the composite clay material at least a part of which is incorporated into the interlayer section of the clay mineral.

The composite clay material of the second aspect incorporating 2 types of the guest molecule into the interlayer section of the clay mineral is different from that of the first aspect incorporating a single type of guest molecule into the interlayer section.

The most important feature of the composite clay material of the second aspect is that the clay mineral organized with the organic onium ion is hydrogen bonded to the first guest molecule having the polar group; at least part of the above-described first guest molecule and the second guest molecule having no polar group is incorporated into the interlayer section of the clay mineral, respectively; and the molecular length of the first guest molecule is equal to or smaller than that of the organic onium ion and the molecular length of the second guest molecule exceeds that of the organic onium ion.

A function of the composite clay material of the second aspect is described.

Figure 2:
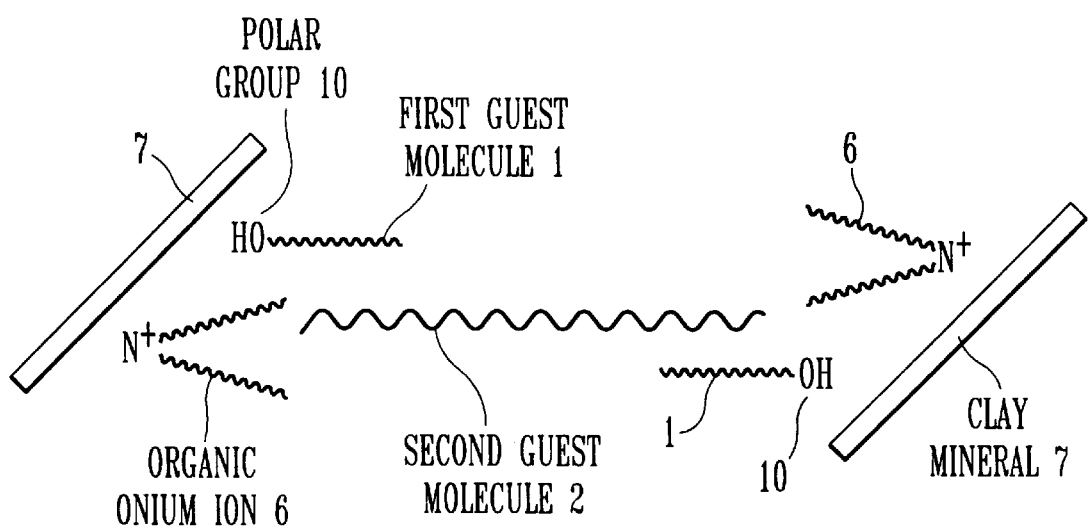
FIG. 2 is a pictorial view showing a structure of the composite clay material of the second aspect of the present invention.

As FIG. 2 shows, the clay mineral 7 is organized through bonding to the organic onium ion 6. As a result, a certain space is formed between the layers of the clay mineral 7.

The first and the second guest molecules 1 and 2 are incorporated into the interlayer space of the clay mineral 7.

The first guest molecule 1 having a polar group 10 is hydrogen bonded to a silicate group of the clay mineral 7 and remains in the interlayer section. The first guest molecule 1 has a molecular length equal to or smaller than that of the organic onium ion, it is easier for the first guest molecule to enter into the interlayer section compared with the main guest molecule incorporated into the interlayer section in the first aspect. So the interlayer section of the clay mineral 7 becomes hydrophobic, exhibiting compatibility to the second guest molecule 2 having non polar group, which allows the second guest molecule 2 to be kept therein in a stable manner. The second guest molecule 2 having the molecular length larger than that of the organic onium ion expands the interlayer section.

The thus expanded interlayer section of the clay mineral is further expanded limitlessly. In the above-described composite clay material, the clay mineral as a polar substance can be uniformly dispersed in a matrix formed of low polar polymers on a molecular level. It can be sufficiently and uniformly dispersed even in the non polar polymers.

Since the clay mineral is expandable limitlessly, its surface area is far greater than that of the clay mineral expanded to a limited degree. The above-formed clay mineral, thus, has a high imperviousness to gas or liquid (water, oil or the like).

Since each motion of the first and the second guest molecules 1 and 2 is restricted in the presence of the clay mineral, they firmly entangle with each other which hardly becomes unloosened. The resultant article formed of the composite clay mineral has excellent mechanical strength such as tensile strength, elastic modulus and improved creep resistance.

Most of the first guest molecule having small molecular length is inherently provided with the polar group. In case where the first guest molecule has no polar group, the polar group can be easily incorporated because of a small molecular length of the first guest molecule. On the contrary, the second guest molecule having a large molecular length has no polar group, thus requiring no incorporation of the polar group. As a result, the difficult process for incorporating the polar group to the substance having a large molecular length can be omitted.

The first and the second guest molecules of the composite clay material of the the second aspect can be easily obtained and handled. Therefore various kinds of polymer or oligomer can be used as the first and the second guest molecules.

The composite clay material of the second aspect is described in detail.

The molecular length of the first guest molecule is equal to or smaller than that of the organic onium ion. In case where the first guest molecule has a larger molecular length than that of the organic onium ion, the selection range of the first guest molecule soluble in the low polar polymer is restricted.

As the mixture ratio of the first guest molecule increases, the interlayer distance of the clay mineral is likely to further expand.

It is preferable that 0.1 wt. % or more amount of the first guest molecule is mixed with 1 wt. % of the organized clay mineral. In case where less than 0.1 wt. % of the first guest molecule is mixed, the interlayer section cannot be sufficiently expanded.

The polar group of the first guest molecule is hydrogen bonded to the clay mineral. At least a part of the first guest molecule is incorporated into the interlayer section of the clay mineral. The whole part of the first guest molecule does not have to be incorporated into the interlayer section. The interlayer section can be sufficiently expanded if 10 wt. % or more to the whole molecular weight of the first guest molecule is incorporated. While if less than 10 wt. % of the first guest molecule is incorporated, the interlayer expansion may become insufficient.

The polar group of the first guest molecule, clay mineral and organic onium ion in the second aspect is preferably similar to that of the main guest molecule and those in the first aspect.

The second guest molecule may be an oligomer or a polymer having low polarity and no polar group. The molecular length of the second guest molecule is larger than that of the organic onium ion. In case where the second guest molecule has the molecular length equal to or smaller than that of the organic onium ion, the interlayer expansion may be insufficient.

The second guest molecule is preferably an oligomer or a polymer having low polarity and molecular weight ranging from about 1000 to about 500000. If the molecular weight is less than 1000, the interlayer expansion of the clay mineral is insufficient. If the molecular weight exceeds 500000, the second guest molecule is likely to be insoluble to the solvent or the softening point or a melting point may be higher than the decomposition point of the clay mineral.

It is preferable that the second guest molecule has its molecular length about 3 or 4 times larger than that of the organic onium ion. As the second guest molecule, for example, liquid polybutadiene, liquid polyisoprene, liquid butyl rubber or the like can be used.

As the mixture ratio of the second guest molecule increases, the interlayer section of the clay mineral is likely to expand. It is preferable to mix the second guest molecule (0.1 wt. % or more) with the organized clay mineral (1 wt. %). Mixing less than 0.1 wt. % of the second guest molecule may fail to expand the interlayer section of the clay mineral sufficiently.

The second guest molecule is at least partially incorporated into the interlayer section of the clay mineral. A whole part of the second guest molecule does not have to be incorporated.

The method for producing the composite clay material of the second aspect includes the steps of: organizing the clay mineral in contact with the organic onium ion having 6 or more carbon number through ionic bonding therebetween; and contacting the clay mineral with the first guest molecule having the molecular length equal to or smaller than that of the organic onium ion and a polar group therein and the second guest molecule having molecular length larger than that of the organic onium ion and no polar group therein. Then the polar group of the first guest molecule is hydrogen bonded to the clay mineral to cause the clay mineral surface hydrophobic. At least a part of the second guest molecule is incorporated into the interlayer section of the clay mineral.

The most important feature of the above-described method is that the-clay mineral organized in contact with the organic onium ion is contacted with the first and the second guest molecules.

According to the producing method, the clay mineral is organized through bonding to the organic onium ion. As a result, a certain space is formed between layers of the clay mineral.

The organized clay mineral is then brought into contact with the first and the second guest molecules 1 and 2 which have been incorporated into the above-formed interlayer space. A polar group 10 of the first guest molecule 1 is hydrogen bonded to the clay mineral 7 and remains between the layers of the clay mineral 7, causing the interlayer space hydrophobic. The first guest molecule cannot be eliminated due to polarity of the clay mineral.

So the low polar second guest molecule 2 which has been incorporated into the interlayer section of the clay mineral is not eliminated due to the polar group of the clay mineral but remains stably.

The second guest molecule 2 has a larger molecular length and higher balkiness compared with the organic onium ion 6. The second guest molecule 2 remaining in the interlayer section of the clay mineral expands the space between those layers limitlessly.

As a result, the above-described producing method provides the composite clay material which allows the clay mineral as the polar substance to be uniformly dispersed in the low polar matrix on the molecular level.

The organized clay mineral is brought into contact with the first and the second guest molecules in any order. The clay mineral can be contacted with both the first and the second guest molecules simultaneously. Alternatively the clay mineral can be contacted with either one of the guest molecule first and then the other guest molecule second.

In any case, the same function and effect can be obtained.

The method for contacting the clay mineral with the organic onium ion or the first and the second guest molecule may be the same as that described with respect to the first aspect.

The second aspect can be used for a molding material, reinforcement material, filling material or the like.

A blend material of the clay mineral may be formed by blending a resin material which is the same as or different from the second guest molecule type with the composite clay material of the second aspect as the base material.

The composite clay material is formed of a clay mineral organized with the organic onium ion having 6 or more carbon number, a first guest molecule having a molecular length equal to or smaller than that of the organic onium ion and a polar group therein hydrogen bonded to the clay mineral and a second guest molecule having a molecular length larger than that of the organic onium ion and no polar group therein. In this composite clay material, the first and the second guest molecules at least partially enter into the interlayer section of the clay mineral, respectively. The blend material is derived from mixing the composite clay material of the second aspect with the resin material formed of an oligomer or a polymer which is the same as or different from the second guest molecule.

In this blend material, the clay mineral is uniformly dispersed in the matrix formed of the resin material in the same way as in the blend material using the composite clay material of the first aspect. The blend material is formed into a molding article exhibiting excellent mechanical strength such as tensile strength and elastic modulus and creep resistance.

It is preferable that the interlayer distance of the clay mineral of the blend material is further expanded so that the clay mineral can be uniformly dispersed in the resin material. The mixture ratio of the resin material and the clay mineral is adjusted for changing the interlayer distance.

As the resin material, a resin which is the same as or different from the second guest molecule type is used. For example, a low polar or non-polar polymer or oligomer such as polyethylene, polypropylene, polybutylene, polyisoprene, polystyrene, acrylic resin, polyamide, polyester or the like may be used, but not limited thereto. The blend material of the clay mineral can be used for an injection molding material, extrusion molding material, press molding material, painting resin material or the like.

A composite clay rubber material of the third aspect is obtained by kneading the following material:

a first composite clay material formed of a clay mineral organized through ionic bonding to the organic onium ion having 6 or more carbon number, a first guest molecule having a molecular length equal to or smaller than that of the organic onium ion and polar group therein hydrogen bonded to the clay mineral and a second guest molecule having a molecular length larger than that of the organic onium ion and no polar group therein, where the first and the second guest molecules are at least partially incorporated into the interlayer section of the clay mineral, respectively;

a second composite clay material formed of a clay mineral organized through ionic bonding to the organic onium ion having 6 or more carbon number and a main guest molecule having a molecular length equal to or larger than that of the organic onium ion and a polar group therein, where the main guest molecule is at least partially incorporated into the interlayer section of the clay mineral and the polar group is hydrogen bonded to the clay mineral; and a rubber material. At least one of the second guest molecule and the main guest molecule is crosslinked with the rubber material molecule.

The composite clay rubber material of the third aspect is prepared by kneading the rubber material with at least one of the first or the second composite clay material.

The most important feature of the third aspect of the invention is that the rubber material is kneaded with the composite clay material in which the guest molecule is incorporated into the interlayer section of the clay mineral and the incorporated guest molecule of th composite clay material is crosslinked with the molecule of the rubber material.

A function and effect of the composite clay rubber material of the third aspect is described.

The composite clay rubber material is prepared by kneading one type of the composite clay materials in which the guest molecule is incorporated into the interlayer of the organized clay mineral with the rubber material so that the guest molecule is cross-linked with the rubber material molecule. Conventionally the rubber molecule cannot be uniformly dispersed in the clay mineral. However in the composite clay rubber material of the third aspect, the clay mineral can be uniformly dispersed in the rubber molecule, leaving sufficient interlayer distance.

Figure 3:
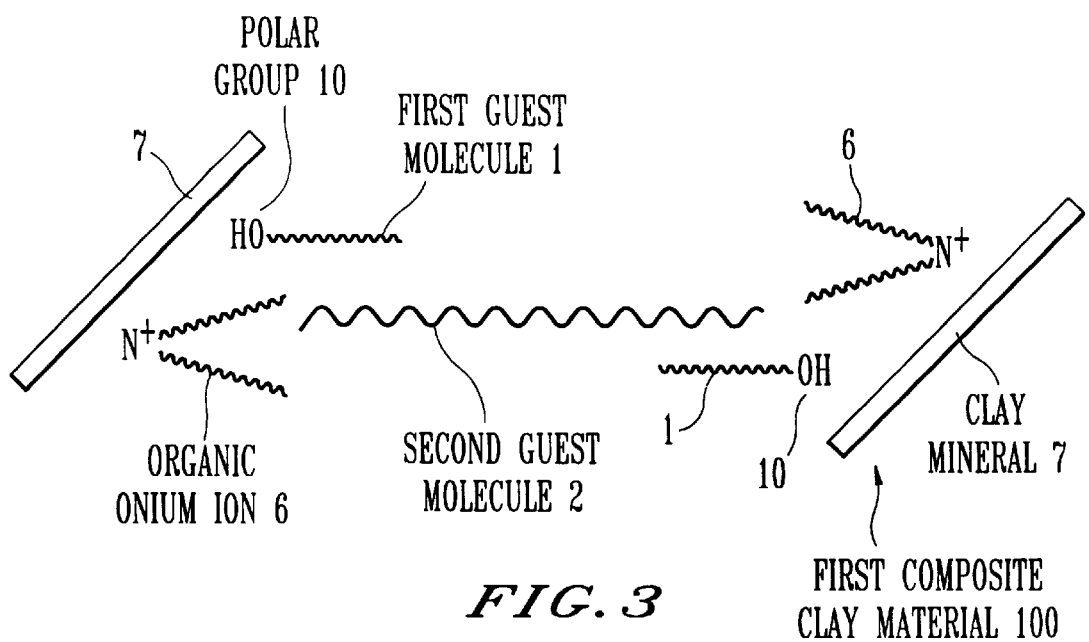
FIG. 3 is a schematic view showing a structure of the first composite clay material of the third aspect of the present invention.

As FIG. 3 shows, in the first composite clay material 100, the interlayer section of the clay mineral 7 organized with the organic onium ion 6 has sufficient distance for accommodating low polar oligomer or a polymer. Conventionally the incorporated oligomer or a polymer is likely to be eliminated due to polarity of the silicate layer in the clay mineral. In the above-prepared composite clay rubber material, however a polar group 10 is hydrogen bonded to the silicate layer of the clay mineral 7 by combining the first guest molecule 1 with the polar group 10, whereby the polar group 10 remains between layers of the clay mineral 7. The interlayer section of the clay mineral 7 is brought into the hydrophobic condition for keeping the second guest molecule 2 having no polar group therebetween. Since the second guest molecule 2 has a molecular length larger than that of the organic onium ion, the interlayer distance is sufficiently expanded.

Figure 4:
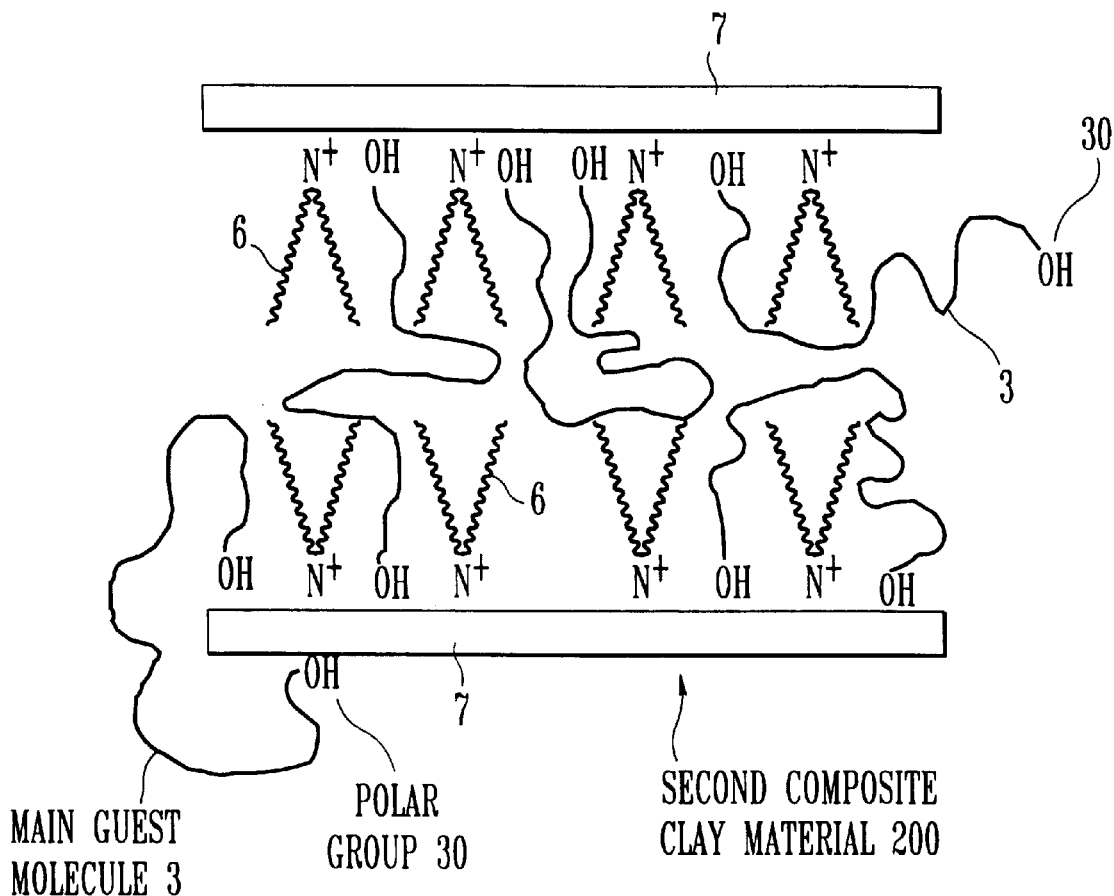
FIG. 4 is a schematic view showing a structure of the second composite clay material of the third aspect of the present invention.
Figure 5:
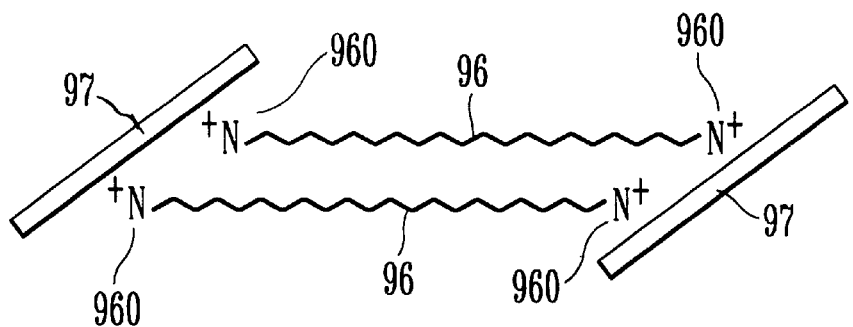
FIG. 5 is a schematic view showing a structure of a conventional composite clay material.

As FIG. 4 shows, in the second composite clay material, an interlayer section of the clay mineral 7 organized with the organic onium ion 6 accommodates the main guest molecule 3 having a polar group 30 for hydrogen bonding to the silicate layer of the clay mineral 7. As a result, the main guest molecule 3 remains in the interlayer section of the clay mineral 7. Since the main guest molecule 3 has a molecular length larger than that of the organic onium ion, the interlayer distance is sufficiently expanded.

The rubber material is kneaded with at least one of the first or second composite clay material having interlayer distance sufficiently expanded. The clay mineral is uniformly dispersed on a molecular level in the rubber material without causing aggregation.

Uniform dispersion of the clay mineral improves the imperviousness to the gas or the like. Since the rubber molecule in the vicinity of the silicate layer is restricted its behavior, mechanical property of the composite clay rubber material is improved.

The composite clay rubber material is described in detail.

The first composite clay material is formed of the clay mineral organized with an organic onium ion, the first guest molecule and the second guest molecule.

The clay mineral of the first composite clay material is organized through ionic bonding to organic onium ion having 6 or more carbon number. In case the organic onium ion has less than 6 carbon number, its hydrophilic property is improved but its compatibility with the first and the second guest molecules is deteriorated. as the organic ion, the following ions may be used: hexylammonium ion, octylammonium ion, 2-ethyl-hexylammonium ion, dodecylammonium ion, octadecylammonium ion, dioctyldimethylammonium ion, trioctylammonium ion, distearyldimethylammonium ion or unsaturated organic onium ion such as: 1-hexenylammonium ion, 9-dodecenylammonium ion, 9-octadecenylammoniu m ion (oleylammonium ion), 9,12-octadecadienylammonium ion (linoleylammonium ion), 9,12,15-octadecatrienylammonium ion (linolenylammonium ion) or the like.

In case of using the organic onium ion dissolved in a solvent for producing the composite clay rubber material, the secondary onium ion is preferably used due to excellent swelling property to the solvent. The organic onium ion in the drawings is fork-like shaped, which represents the secondary onium ion. The present invention, however, does not limit the onium ion to the secondary onium ion type. Preferably the first composite clay material uses the same clay mineral as those of the first aspect.

Preferably the first composite clay material uses the first guest molecule and the second guest molecule which are the same as those of the second aspect.

The second composite clay material is formed of a clay mineral organized with an organic onium ion and a main guest molecule.

The second composite clay material uses the clay mineral, organic onium ion and the polar group of the main guest molecule which may be the same as or different from the clay mineral, organic onium ion and the polar group of the first guest molecule of the first aspect. The main guest molecule of the second composite clay material is preferably the same as that of the first aspect.

The rubber material is at least one rubber type selected from the group consisting of a natural rubber, isoprene rubber, chloroprene rubber, styrene rubber, nitryl rubber, ethylene-propylene rubber, butadiene rubber, styrene-butadiene rubber, butyl rubber, epichlorohydrine rubber, acrylic rubber, urethane rubber, fluoro rubber and silicon rubber.

The second guest molecule or the main guest molecule contained in the first and the second composite clay material is sulfur crosslinked with the rubber molecule, which is called as vulcanization, or similarly crosslinked with the rubber molecule, for example, in a manner of peroxide crosslinking. Preferably with the rubber molecule thus crosslinked with the second guest molecule or the main guest molecule may further be crosslinked the organic onium ion in the above-described manner.

As a result, each interface of the silicate layer of th clay mineral and the rubber material is rigidly bonded. This further restricts the motion of rubber molecules in the vicinity of the silicate-layer, leading to improved dynamic properties, especially hardness and elastic modulus.

The composite clay rubber material is prepared through press molding or extrusion molding.

The composite clay rubber material is used for various applications as the general rubber material. Especially this material is effective for improving barrier properties to gas or the like and dynamic properties of the rubber material.

A first method for producing the composite clay rubber material is formed of the steps for organizing a clay mineral in contact with tn organic onium ion having 6 or more carbon number through ionic bonding therebetween; contacting the organized clay mineral with a first guest molecule having the molecular length equal to or smaller than that of the organic onium ion and polar group therein and a second guest molecule having the molecular length larger than that of the organic onium ion and unsaturated group but no polar group contained therein for causing the clay mineral surface hydrophobic through hydrogen bonding between the polar group of the first guest molecule and the clay mineral and inserting the second guest molecule at least partially into the interlayer section of the clay mineral for providing the first composite clay material; and kneading the first composite clay material with the rubber material and crosslinking between the unsaturated group of the second guest molecule and the rubber molecule.

The most important feature of the above first method is that the organized clay mineral surface is caused to be hydrophobic with the first guest molecule containing the polar group, the second guest molecule containing unsaturated group is inserted into the interlayer section of the clay mineral and the unsaturated group and the rubber molecule is crosslinked.

The function of the first method is described.

Referring to FIG. 3, a clay mineral 7 is organized through ionic bonding to an organic onium ion 6, forming a space defined by the layers of the clay mineral 7.

Being contacted with the organized clay mineral, the first and the second guest molecules 1 and 2 are incorporated into the interlayer space. A polar group 10 contained in the first guest molecule 1 is hydrogen bonded to the clay mineral 7 and remains in the interlayer space of the clay mineral 7. As a result, the interlayer section of the clay mineral 7 is caused to be hydrophobic. The low polar second guest molecule 2 can also remains in the interlayer section stably without being eliminated due to polarity of the clay mineral.

Since the second guest molecule 2 has the molecular length larger than that of the organic onium ion 6 and high bulkiness, they remain in the interlayer section of the clay mineral 7 to cause the interlayer section to expand sufficiently.

Kneading the first composite clay material 100 sufficiently expanded with the rubber material leads to provide a composite clay rubber material in which the clay mineral as the inherently polar substance is uniformly dispersed in the low polar rubber material on a molecular level.

The unsaturated group of the second guest molecule is crosslinked with the rubber molecule during kneading with the rubber material. So the motion of the rubber molecule in the vicinity of the silicate layer is restricted, improving dynamic properties of the composite clay rubber material.

Further it is preferable that the organic onium ion has unsaturated group and is crosslinked with the unsaturated group of the second guest molecule and unsaturated group of the rubber material during the above step for kneading the first composite clay material with the rubber material.

The unsaturated organic onium ion serves to form crosslinking among the unsaturated group of the unsaturated organic onium ion, unsaturated group of the second guest molecule and the rubber material molecule during the step for kneading the unsaturated guest molecule with the rubber material.

The crosslinking contributes to rigid bonding of each interface of the silicate layer of the clay mineral and the rubber material. Accordingly this restricts the motion of rubber molecules in the vicinity of the silicate layer, leading to improved dynamic properties, especially hardness and elastic modulus.

The clay mineral and the organic onium ion are contacted through, for example, ion exchange method. This method is executed by dispersing the clay mineral in water solution containing the organic onium ion and then washing the clay mineral with water for removing excessive organic onium ion.

Contacting either or both of the first and the second guest molecule with the organized clay mineral and contacting the first guest molecule to the second guest molecule are preferably executed through the same way employed in the second aspect.

Kneading the first composite clay material with the rubber material is executed through a conventional method for kneading the rubber material. It is preferable to have kneading with a rubber roll by keeping the material temperature at 100° C. or lower. This is because that the temperature exceeding 100° C. may develop the crosslinking during kneading.

When kneading the first composite clay material and the rubber material, sulfur crosslinking called vulcanization or similar crosslinking has to be formed therebetween. Therefore it is necessary that the second guest molecule of the first composite clay material contains the unsaturated group where double or triple bonding is formed between carbon atoms. The second guest molecule having the unsaturated group may be, for example, liquid polybutadiene, liquid polyisoprene, liquid butyl rubber or the like.

It is preferable to add a vulcanizing agent such as sulfur, vulcanization accelerator, crosslinking agent such as peroxide and filling agent such as carbon to the mixture material during kneading.

The second method for producing the composite clay rubber material is formed of the steps for organizing an clay mineral in contact with an organic onium ion having 6 or more carbon number through ionic bonding therebetween; contacting the organized clay mineral with a main guest molecule having polar group and unsaturated group and molecular length equal to or larger than that of the organic onium ion and inserting the main guest molecule at least partially into the interlayer section of the clay mineral for hydrogen bonding therebetween to provide a second composite clay material; and then kneading the second composite clay material with the rubber material and crosslinking between the unsaturated group of the main guest molecule and the rubber molecule.

The most important feature of the above second method is that the main guest molecule containing the polar group and the unsaturated group into the interlayer section of the organized clay mineral and the unsaturated group and the rubber molecule are crosslinked.

Unlike the first method using the first and the second guest molecules, the second method uses the main guest molecule.

The main guest molecule contains the polar group and the unsaturated group and has a molecular length equal to or larger than that of the organic onium ion. The main guest molecule may be, for example, polybutadiene having hydroxyl group (—OH) at both ends, and polyisoprene having hydroxyl group at both ends.

The effect of the second method is described.

Referring to FIG. 4, a space is formed between layers of a clay mineral 7 by bonding an organic onium ion 6 to the clay mineral 7.

The organized clay mineral 7 is brought into contact with a main guest molecule 3 having a polar group 30. The main guest molecule 3 then enters into the interlayer section of the clay mineral 7. The polar group 30 of the entering main guest molecule 3 is hydrogen bonded to the silicate layer of the clay mineral 7. This bonding allows the main guest molecule 3 to remain in the interlayer section of the clay mineral 7 without being eliminated due to the polarity of the surface of the clay mineral 7. Similar to the first method, the interlayer section of the clay mineral 7 also expands sufficiently. By kneading the second composite clay material 200 which has been expanded in the rubber material, the clay mineral inherently having polarity is uniformly dispersed in the rubber material on a molecular level.

The unsaturated group of the main guest molecule is crosslinked with the rubber molecule, thus improving the dynamic property of the composite clay rubber material.

Further it is preferable that the organic onium ion has unsaturated group and is crosslinked with unsaturated group of the main guest molecule and unsaturated group of the rubber material during the above step for kneading the second composite clay material with the rubber material.

The unsaturated organic onium ion forms crosslinking among the unsaturated group of the unsaturated organic onium ion, the unsaturated group of the main guest molecule and molecules of the rubber material in the same manner as described above. The crosslinking contributes to rigid bonding of each interface of the silicate layer of the clay mineral and the rubber material.

Accordingly this restricts the motion of rubber molecules in the vicinity of the silicate layer, leading to improved dynamic properties of the composite clay rubber material, especially hardness and elastic modulus.

It is also possible to knead both the first and the second composite clay material with the rubber material so as to form crosslinking among the second guest molecule, main guest molecule and the rubber molecule. This method provides the same effect as described above. Other aspects are the same as those of the first method.

DESCRIPTION OF THE PREFERRED EMBODIMENT

EXAMPLE 1

A composite clay material of an example according to the first aspect of the present invention is described.

As FIG. 1B shows, the composite clay material of this example is formed of a clay mineral 7 which has been organized through ionic bonding to an organic onium ion 6 and a main guest molecule 3 having a polar group 30 at both ends. The main guest molecule 3 is at least partially incorporated into a space between layers of the clay mineral 7. The polar group 30 of the main guest molecule 3 is hydrogen bonded to the clay mineral 7.

As the clay mineral, sodium montmorillonite (produced in Yamagata pref.; ion exchange capacity: 120 meq/100 g) was used. As the organic onium ion, distearyldimethyl ammonium chloride (carbon number: 38) was used.

As the main guest molecule, hydrogen added polybutadiene (average carbon number : 210; molecular weight: approx. 3000) with its ends bonded to hydroxyl (OH) group was used (Trademark: polytail H produced by MITSUBISHI KAGAKU Co., Ltd.)(hereinafter referred to as "polytail H").

The method for producing the composite clay material is described.

First 20.0 g of the montmorillonite was dispersed into 2000 ml of 80° C. water. Then 21.0 g of distearyl methyl ammonium chloride was dissolved into 1500 ml of 80° C. water. Both water solutions were mixed and filtered. The resultant precipitate was washed with 80° C. water twice.

A montmorillonite organized through ionic bonding to the distearyl dimethyl ammonium ion was obtained by evaporating the water. The obtained montmorillonite is hereinafter referred to as "DSDM-montmorillonite". The inorganic content of the resultant DSDM-montmorillonite was 54.2 wt. %. The interlayer distance of the montmorillonite was measured with the X-ray diffraction method for observing expansion behavior. The interlayer distance of the DSDM-montmorillonite measured 32.8 Å.

Next 1 g of the polytail H and 1 g of the DSDM-montmorillonite were added to 20 g of toluene as solvent, which was mixed for 6 hours. The mixture ratio of the polytail H to 1.0 g of the DSDM-montmorillonite was 1.0 g.

The toluene was subjected to evaporation under reduced pressure to provide the composite clay material. The interlayer distance of the montmorillonite contained in the composite clay material measured 38.7 Å E with the x-ray diffraction method.

This shows that adding the polytail H, produced by incorporating hydroxyl group into the hydrogenerated polybutadiene, contributed to expand the interlayer distance of the montmorillonite compared with the case where no polytail H was added.

EXAMPLE 2

In this example, the composite clay material was produced in the same manner as the Example 1 except that the mixture ratio of the polytail H as the main guest molecule was changed. The interlayer distance of the montmorillonite as the clay mineral was measured with the X-ray diffraction method. The resultant measurements are shown in Table 2.

Table 2 shows that the interlayer distance of the montmorillonite expands with the increase in the mixture ratio of the polytail H. When the mixture ratio of the polytail H is 10.0 g to 1 g of the DSDM-montmorillonite, clear peak was not observed because the interlayer distance exceeds 88 Å E as the measurement limit.

It is obvious that the interlayer distance of the clay mineral expands with the increase in the added amount of the main guest molecule having the polar group.

TABLE 2

| Mixture ratio of Polytail H/DSDM-montmorillonite (g/g) | Interlayer distance of montmorillonite (Å) |
| --- | --- |
| 0 (DSDM-montmorillonite only) | 32.8 |
| 0.5 | 37.1 |
| 1.0 | 38.7 |

TABLE 2-continued

| Mixture ratio of Polytail H/DSDM-montmorillonite (g/g) | Interlayer distance of montmorillonite (Å) |
| --- | --- |
| 1.5 | 41.6 |
| 2.0 | 41.8 |
| 3.0 | 42.9 |
| 5.0 | 62.1 |
| 10.0 | -No clear peak |

EXAMPLE 3

In this example, the composite clay material was produced in the same manner as the Example 1 except that the type of the polar group incorporated into the main guest molecule and the molecular weight of the main guest molecule were changed. The polar group type and the molecular weight of the main guest molecule are shown in Table 3.

The interlayer distance of the montmorillonite as the clay mineral was measured with the X-ray diffraction method. The measurement results are also shown in Table 3.

As Table 3 shows, when molecular weight of the polytail H as the main guest molecule is either 1500 or 3000, the interlayer distance resulted in relatively larger ones. When using hydroxyl (OH) group, carboxyl (COOH) group and epoxy group as the polar group, the interlayer distance measured as large as 40 Å or more.

TABLE 3

| End group construction | Molecular weight | Interlayer distance (Å) |
| --- | --- | --- |
| OH | 3000 | 42.4 |
| OH | 1500 | 47.7 |
| COOH | 1500 | 53.8 |
| OCH$_2$CH CH$_2$ \\/ O | 3000 | 40.5 |
| Cl | 3000 | 40.3 |

COMPARATIVE EXAMPLE 1

A composite clay material as a comparative example was produced in the same manner as the Example 1 except that a main guest molecule having no polar group (liquid butyl rubber produced by Hardman Co., Product name: Karen 800) was added to the DSDM-montmorillonite by changing its mixture ratio. Each measurement of the interlayer distance of the clay mineral in various composite clay materials is shown in Table 4.

Table 4 shows that the interlayer distance does not expand in spite of adding a large amount of the main guest molecule.

TABLE 4

| Mixture ratio of Karen 800/DSDM-montmorillonite (g/g) | Interlayer distance of montmorillonite (Å) |
| --- | --- |
| 0 (DSDM-montmorillonite only) | 32.8 |
| 1.0 | 33.1 |
| 1.5 | 32.8 |
| 2.0 | 32.8 |

TABLE 4-continued

| Mixture ratio of Karen 800/DSDM-montmorillonite (g/g) | Interlayer distance of montmorillonite (Å) |
|---|---|
| 3.0 | 33.7 |
| 5.0 | 33.8 |
| 10.0 | 33.8 |

EXAMPLE 4

In this example, the composite clay material was produced in the same manner as the Example 1 except that stearyl ammonium ion (carbon number : 18) was used as the organic onium ion. The mixture ratio of the main guest molecule to 1 g of the organized clay mineral was 1 g.

The interlayer distance of the composite clay material measured 35.6 Å.

This shows that the aforementioned organic onium ion also contributed to expand the interlayer distance.

EXAMPLE 5

In this example, the composite clay material was produced in the same manner as the Example 1 except that lauryl ammonium ion (carbon number: 12) was used as the organic onium ion and stearic acid (carbon number: 18) was used as the main guest molecule and the mixture ratio of the main guest molecule to 1 g of the organized clay mineral was 10 g.

The interlayer distance of the composite clay material measured 42.0 Å.

This shows that using non-polymer stearic acid as the main guest molecule contributed to expand the interlayer distance of the clay mineral.

EXAMPLE 6

In this example, the composite clay material was produced in the same manner as the Example 1 except that mica was used as the clay mineral and the mixture ratio of the main guest molecule to 1 g of the organized clay mineral was 1 g.

The interlayer distance of the clay mineral measured 41.0Å. This shows that using mica as the clay mineral contributed to expand the interlayer distance similar to the Example 1.

EXAMPLE 7

In this example, the composite clay material was produced in the same manner as the Example 1 except that saponite was used as the clay mineral. The interlayer distance of the clay mineral measured 37.8 Å.

EXAMPLE 8

In this example, the composite clay material was produced in the same manner as the Example 1 except that lauric acid ammonium ion was used as the organic onium ion and a polymer having epoxy group at both ends (produced by MITSUBISHI KAGAKU; Product name: polytail EP; carbon number : approx.200; melting point : 56–59 ° C. ) as the main guest molecule. The mixture ratio of the main guest molecule to 1 g of the organized clay mineral was 1 g.

In order to produce the aforementioned composite clay material, 20 g of the montmorillonite was dispersed in 2000 ml of 80° C. water. Then 6.2 g of the lauric acid ammonium ion was dissolved in 1500 ml of 80° C. water. Both water solutions were mixed and filtrated. The resultant precipitate was washed with 80° C. water twice to provide the organized montmorillonite through ionic bonding to the lauric acid ammonium ion, which is referred to as LA-montmorillonite.

The LA-montmorillonite was added to the main guest molecule which has been heated and melted at 100° C., which was mixed for 6 hours, resulting in the composite clay material.

The interlayer distance of the clay mineral measured 48.0 Å. This shows that adding the LA-montmorillonite to the solution containing the main guest molecule contributed to expand the interlayer distance.

EXAMPLE 9

In this example, the composite clay material was produced in the same manner as the Example 1 except that stearyl ammonium ion (carbon number : 18) was used as the organic onium ion and polypropylene oligomer (produced by SANYO KASEI; Product name: Yumex1010; Molecular weight: 30000; Softening point: 145° C. ) as the guest molecule (hereinafter referred to as "Yumex 1010"). The mixture ratio of the guest molecule to 1 g of the organized clay mineral 1 was 1 g. In order to produce the composite clay material, the guest molecule was heated and melted at 200° C. to which the organized clay mineral was added and mixed for 30 minutes, resulting in the composite clay material.

The interlayer distance of the clay mineral measured 38.2Å.

This shows that adding the organized clay mineral into the solution containing the guest molecule contributed to expand the interlayer distance.

EXAMPLE 10

In this example, the composite clay material was produced in the same manner as the Example 9 except that the mixture ratio of the Yumex 1010 as the guest molecule was changed.

The interlayer distance of the montmorillonite as the clay mineral was measured. The measurement results are shown in Table 6.

Table 6 shows that the interlayer distance of the montmorillonite expands with the increase in the mixture ratio of the Yumex 1010.

When using the guest molecule having the polar group and softening point higher than a room temperature, adding a large amount of them at the temperature higher than the softening point allows the clay mineral to expand the interlayer distance.

COMPARATIVE EXAMPLE 2

In this comparative example, the composite clay material was produced in the same manner as the Example 1 except that butyl ammonium ion (carbon number : 4) was used as the organic onium ion and stearyl alcohol (carbon number : 18) was used as the main guest molecule. The mixture ratio of the main guest molecule to 1 g of the organized clay mineral 1 was 10 g.

The interlayer distance of the clay mineral measured 13.8Å. The carbon number 4 of the butyl ammonium ion as the organic onium ion was too small to expand the interlayer distance.

COMPARATIVE EXAMPLE 3

In this example, the composite clay material was produced in the same manner as the Example 1 except that mica was used as the clay mineral and octadecan (carbon number : 18) was used as the main guest molecule. The mixture ratio of the main guest to 1 g of the organized clay mineral was 10 g.

The interlayer distance of the clay mineral measured 33.2Å. The octadecan as the main guest molecule is a non-polymer having no functional group at the end, which is incompatible with the hydrophilic clay mineral. The octadecan was, thus, eliminated from the clay layer surface, failing to expand the interlayer distance of the clay mineral.

Table 5 shows each composition of the composite clay material in Examples 1, 4 to 9, and comparative examples 2 and 3, as well as the respective interlayer distance of the clay mineral.

ion with 6 or more carbon number, a first guest molecule 1 having molecular length equal to or smaller than that of the organic onium ion and its polar group 10 hydrogen bonded to the clay mineral 7 and a second guest molecule 2 having the molecular length larger than that of the organic onium ion and no polar group contained therein. The first and the second guest molecules are at least partially incorporated into the interlayer section of the clay mineral 7, respectively.

As the clay mineral, sodium montmorillonite (produced in Yamagata pref.; ion exchange capacity: 120 meq/100 g) was used. As the organic oinum ion, distearyl dimethyl ammonium ion (carbon number : 38) was used. As the first guest molecule, stearic acid (carbon number 18) was used and as the second guest molecule, liquid butyl rubber (produced by Hardman; Product name: Karen 800) with the molecular weight of 5000 was used.

The method for producing the composite clay material is described.

TABLE 5

|  | Organic onium ion | Clay mineral | Guest molecule | Mixture ratio of the guest molecules amount(*) | Interlayer distance of the clay mineral |
|---|---|---|---|---|---|
| Example 1 | distearyl dimethyl-ammonium chloride | montmorillonite | polyolefine with OH group at both ends (molecular weight: 3000) | 1 | 38.7 |
| Example 4 | stearylammoniuim ion | montmorillonite | polyolefine with OH group at both ends (molecular weight: 3000) | 1 | 35.6 |
| Example 5 | lauryl ammonium ion | montmorillonite | stearic acid | 10 | 42.0 |
| Example 6 | distearyl dimethyl-ammonium chloride | mica | polyolefine with OH group at both ends (molecular weight: 3000) | 1 | 41.0 |
| Example 7 | distearyl dimethyl-ammonium chloride | saponite | polyolefine with OH group at both ends (molecular weight: 3000) | 1 | 37.8 |
| Example 8 | lauric acid ammonium ion | montmorillonite | polymer with epoxy group at both ends (melting point: 56–59° C.) | 1 | 48.0 |
| Example 9 | stearylammonium ion | montmorillonite | polypropylene containing anhydrous carboxylic acid (molecular weight: 30000; softening point: 145° C.) | 1 | 38.2 |
| Comparative example 2 | butylammonium ion | montmorillonite | stearyl alcohol | 10 | 13.8 |
| Comparative exmaple 3 | distearyl dimethyl-ammonium chloride | mica | octadecan | 10 | 33.2 |

Mixture ration of the guest molecule's amount: Mixture ratio of the guest molecule (g) to 1 g of the organized clay mineral

TABLE 6

| Mixture ratio of Yumex 1010/ montmorillonite organized with stearyl ammonium ion (g/g) | Interlayer distance of montmorillonite (Å) |
|---|---|
| 0 (organized montmorillonite only) | 21.5 |
| 0.25 | 24.4 |
| 1 | 38.2 |
| 3 | 72.3 |

EXAMPLE 11

A composite clay material of the example according to the second aspect of the present invention is described.

Referring to FIG. 2, the composite clay material is formed of a clay mineral 7 which is organized with an organic onium First 20 g of the montmorillonite was dispersed in 2000 ml of 80° C. water. Then 21.0 g of distearyl dimethyl ammonium chrolide was dissolved in 1500ml of 80° C. water. Both water solutions were mixed and filtrated. The resultant precipitate was washed with 80° C. water twice to provide the montmorillonite which has been organized with distearyl dimethyl ammonium ion (hereinafter referred to as DSDM-montmorillonite).

The inorganic content of the resultant DSDM-montmorillonite was 54.2 wt. %. The interlayer distance of the montmorillonite was measured with the X-ray diffraction method for observing expansion behavior. The interlayer distance of the DSDM-montmorillonite measured 32.8 Å.

Next 1.0 g of the DSDM-montmorillonite, 0.5 g of stearic acid and 1.0 g of liquid butyl rubber (produced by Hardman Co; Product name: Karen 800) were added to 20 g of toluene as solvent, which was mixed for 6 hours. The toluene was subjected to evaporation under reduced pressure to provide the composite clay material.

The interlayer distance of the montmorillonite contained in the composite clay material measured 54.8 Å with the X-ray diffraction method.

This shows that adding the stearic acid and liquid butyl rubber contributed to expand the interlayer distance of the montmorillonite compared with the case where no such material was added.

EXAMPLE 12

In this example, the composite clay material was produced in the same manner as the Example 11 except that stearic acid as the first guest molecule and liquid butyl rubber as the second guest molecule (produced by Hardman Co., Product name: Karen 800) were added by changing the mixture ratio thereof. As the organic clay mineral, 1.0 g of the DSDM-montmorillonite of the Example 11 was used.

The interlayer distance of the montmorillonite as the clay mineral was measured with the X-ray diffraction method. The measurement results are shown in Table 7. Table 7 shows that the interlayer of the montmorillonite expands with the increase in added amount of stearic acid as the first guest molecule.

TABLE 7

| Organized clay mineral (g) | First guest molecule Stearyl acid (g) | Second guest molecule Liquid butyl rubber (g) | Interlayer distance of the clay mineral (Å) |
|---|---|---|---|
| 1.0 | 0 | 1.0 | 36.3 |
| ↑ | 0.1 | ↑ | 42.9 |
| ↑ | 0.5 | ↑ | 54.8 |
| ↑ | 1.0 | ↑ | 55.2 |
| ↑ | 2.0 | ↑ | 58.5 |
| ↑ | 1.0 | 0 | 44.0 |

EXAMPLE 13

In this example, the composite clay material was produced in the same manner as the Example 12 except that stearyl alcohol was used as the first guest molecule and mixture ratio of the first and the second guest molecules was changed.

The interlayer distance of the montmorillonite as the clay mineral was measured with the X-ray diffraction method. The measurement results are shown in Table 8. Table 8 shows that the interlayer of the montmorillonite expands with the increase in added amount of the stearyl alcohol as the first guest molecule.

TABLE 8

| Organized clay mineral (g) | First guest molecule Stearyl alcohol (g) | Second guest molecule Liquid butyl rubber (g) | Interlayer distance of the clay mineral (Å) |
|---|---|---|---|
| 1.0 | 0 | 1.0 | 36.3 |
| ↑ | 0.1 | ↑ | 42.4 |
| ↑ | 0.5 | ↑ | 53.5 |
| ↑ | 1.0 | ↑ | 52.9 |
| ↑ | 2.0 | ↑ | 57.0 |
| ↑ | 1.0 | 0 | 42.0 |

EXAMPLE 14

In this example, the composite clay material was produced in the same manner as the Example 11 except that 1.0 g of liquid polyisoprene (produced by Kuraray; Product name: Kuraprene LIR-30) was employed as the second guest molecule. This liquid polyisoprene has the molecular weight of 29000 and no functional group contained therein.

The interlayer distance of the montmorillonite as the clay mineral in the composite clay material measured 55.9Å with the X-ray diffraction method.

EXAMPLE 15

In this example, the composite clay material was produced in the same manner as the Example 11 except that 1.0 g of liquid polybutadiene (produced by NIPPON SODA, Product name: B-2000) was used as the second guest molecule. This liquid polybutadiene has the molecular weight of 1800 to 2200 and no functional group contained therein.

The interlayer distance of the montmorillonite as the clay mineral in the composite clay material measured 59.2Å with the X-ray diffraction method.

EXAMPLE 16

In this example, the composite clay material was produced in the same manner as the Example 11 except that swelling mica (produced by Corp Chemical) as the clay mineral organized with lauryl ammonium ion (carbon number : 12) as the organic onium ion, lauric acid (carbon number : 12) as the first guest molecule and polystyrene (molecular weight : 25000) as the second guest molecule were mixed by the mixture ratio of 1 : 1 : 10, respectively.

The interlayer distance of the mica as the clay mineral in the composite clay material measured 120Å or more with the x-ray diffraction method. When no lauric acid as the first guest molecule was added, the resultant interlayer distance measured as small as 18 Å.

EXAMPLE 17

A composite clay rubber material of this example according to the third aspect of the present invention is described.

The composite clay rubber material is produced by kneading the first composite clay material and rubber material and the second guest molecule contained in the first composite clay material is crosslinked with the rubber molecule.

Referring to FIG. 3, the above composite clay material is formed of a clay mineral 7 organized with an organic onium ion having 6 or more carbon number, a first guest molecule 1 having molecular length equal to or smaller than that of the organic onium ion and polar group 10 hydrogen bonded to the clay mineral 7, and a second guest molecule 2 having the molecular length larger than that of the organic onium ion and no polar group contained therein. The first and the second guest molecules are at least partially incorporated into the interlayer section of the clay mineral 7, respectively.

As the clay mineral, sodium montmorillonite (produced in Yamagata pref.; ion exchange capacity: 120 meq/100 g) was used. As the organic onium ion, distearyldimethyl ammonium ion having 38 carbon number. As the first guest molecule, stearic acid having 18 carbon number was used. As the second guest molecule, liquid butyl rubber (produced by Hardman Co., ; Product name : Karen 800) having molecular weight of 5000 was used.

The method for producing the above described composite clay rubber material is described.

First 20 g of the montmorillonite was dispersed in 2000 ml of 80° C. water. Then 21.0 g of distearyl dimethyl ammonium chrolide was dissolved in 1500 ml of 80° C.

water. Both solutions were mixed and filtrated. The resultant precipitate was washed with 80° C. water twice to provide the montmorillonite which has been organized with DSDM-montmorillonite.

The inorganic content of the resultant DSDM-montmorillonite was 54.2 wt. %. The interlayer distance of the montmorillonite measured 32.8Å with the X-ray diffraction method for observing expansion behavior.

Next 1.0 g of the DSDM-montmorillonite, 0.5 g of stearic acid and 1.0 g of liquid butyl rubber (produced by Hardman Co; Product name: Karen 800) were added to 20 g of toluene as the solvent, which mixed for 6 hours. The toluene was subjected to evaporation under reduced pressure to provide the first composite clay material.

The interlayer distance of the montmorillonite in the composite clay material measured 54.8Å with the X-ray diffraction method. This shows that the interlayer distance of the montmorillonite can be expanded by adding stearic acid and liquid butyl rubber.

Then the first composite clay material and rubber material were kneaded with a roll in accordance with ASTM D 3182. As the rubber material, butyl rubber (produced by Nihon Synthetic Rubber; product name : Butyl 268) was used.

In the composite clay rubber material, 20 parts per hundred parts of rubber (phr) of the first composite clay material (clay mineral content: 5 phr), 20 phr of the carbon (Asahi carbon : #70), 1 phr of the zinc oxide, 1.75 phr of sulfur and 1 phr of vulcanization accelerator were mixed to 100 phr of the rubber material.

After being kneaded uniformly, the composite clay rubber material was vulcanized for 40 minutes at 150° C., which was formed into a sheet 2 mm in thick. A class 3 dumbbell test sample was cut from the sheet, which was tested for tensile strength. The resultant tensile strength measured 18.0 MPa.

The sheet 0.5 mm in thick was also prepared, which was examined for permeability to nitrogen gas. The resultant gas permeability factor was $1.9 \times 10^{-11}$ cm$^3$ ·cm/cm$^2$ sec$^{-1}$·cmHg$^{-1}$.

EXAMPLE 18

In this example, various composite clay rubber material was produced by changing mixture ratios of elements, which were formed into the respective sheets (sample 1 to 16). The dynamic property of each sheet was evaluated.

As Table 9 shows, the second composite clay material was used for the composite clay rubber material. Referring to FIG. 4, a second composite clay material 200 is formed of a clay mineral 7 organized with an organic onium ion 6 and a main guest molecule 3 having a polar group 30. As the organized clay mineral, DSDM-montmorillonite (DSDM-Mt) was used. The weight ratio of distearyl dimethyl ammonium ion and montmorillonite of the DSDM-Mt was kept constant. As the main guest molecule, liquid butadiene (produced by NIPPON SODA; Product name: G2000) having OH group at both ends was used (hereinafter referred to as liquid rubber). As the rubber material, butyl rubber (Nihon Synthetic Rubber; Product name: Butyl 268) was used. For comparative purpose, natural montmorillonite (Na-Mt) was used as the clay mineral which has not been organized.

The dynamic property of the molding sheet provided from the composite clay rubber material was evaluated with respect to gas permeability factor, storage elastic modulus, tensile strength, elongation and tensile stress.

The storage elastic modulus was measured with a viscoelasticity spectrometer. The tensile stress was measured in a tensile test.

The measurement results are shown in Table 9. In the column of the composite ratio of the DSDM-Mt, the value in parentheses refers to weight ratio of the montmorillonite and the value left of the parentheses refers to the weight ratio of the distearyl dimethyl ammonium ion in parts of weight. In the column of the gas permeability factor value, dashed part represents that such factor was not measured.

First, the organized or non-organized montmorillonite were studied based on measurement results of Table 9.

The sample 9 using organized DSDM-Mt shows more excellent storage elastic modulus and imperviousness to gas compared with the sample 12 using non-organized montmorillonite. This shows that organizing the montmorillonite improves dynamic characteristics.

When the montmorillonite is organized, the liquid butyl rubber runs into the section between the montmorillonite layers. As a result, the interlayer section is expanded, allowing the montmorillonite to be uniformly dispersed in the rubber material on a molecular level. The montmorillonite restricts molecular behavior of the rubber material, thus improving dynamic characteristics of the composite clay rubber material such as storage elastic modulus, imperviousness to gas or the like.

On the contrary if the montmorillonite is not organized, the liquid butyl rubber is not allowed to run into the interlayer section. As a result, the interlayer section does not expand and the montmorillonite is not uniformly dispersed in the rubber material, So the molecular motion of the rubber material is hardly restricted, failing to improve the dynamic characteristics of the composite clay rubber material.

Secondly the storage elastic modulus of the composite clay rubber material is studied.

As samples 5, 6 and 7 of Table 9 shows, storage elastic modulus is substantially improve with the increase in montmorillonite content. This is because that the more the liquid butyl rubber is flowing into the interlayer section of the montmorillonite, the broader the interlayer section becomes, facilitating uniform dispersion of the montmorillonite in therubber material. As a result, the storage elastic modulus is increased.

The sample 10 containing more montmorillonite than the sample 9 shows improved storage elastic modulus although both samples contain no carbon.

Finally imperviousness to gas of the molding sheet is studied. The sample 1 contains a high amount of carbon and no montmorillonite. While samples 9 and 10 contain low amounts of carbon and high amounts of the montmorillonite. The samples 9 and 10 with high montmorillonite contents show decreased permeability to gas by 60 to 70%. It is obvious that high montmorillonite content may serve to improve the imperviousness to gas.

Increasing the amount of the organized clay mineral (DSDM-Mt) added to constant amounts of the rubber material, carbon and liquid butyl rubber as a main guest molecule (samples 8, 5, 6 and 7) contributed to substantially high storage elastic modulus and tensile strength and elongation as well as excellent imperviousness to gas compared with those samples 1 to 4 and 13 to 16 containing no DSDM-Mt. The samples 5 to 7 containing DSDM-Mt showed excellent tensile stress similar to the comparative samples containing no DSDM-Mt.

The use of the compound having unsaturated alkyl group as the agent for organizing the montmorillonite has resulted in great effects on its storage elastic modulus and tensile characteristics. The unsaturated alkyl group, oligomer molecule and rubber molecule are bonded together, forming very tight structure of molecules around the interface of the clay layer. Such tight structure of molecules improves the above characteristics and also lowers permeability to gas.

above-obtained article was further kneaded with butyl rubber and carbon by changing the compounding ratio as shown in Table 10. Then various types of sheets (samples 21 to 26) were produced. For the purpose of comparison, the sheets containing no composite clay material of the second aspect were prepared as samples 21 to 23.

TABLE 9

| | Composition of composite clay rubber material (wt. %) | | | | Gas permeability | Storage elastic modulus (MPa) | | Tensile strength | Elong-ation | Tensile stress |
|---|---|---|---|---|---|---|---|---|---|---|
| Sample No. | Rubber material | Carbon | Second composite clay material | | Na-Mt | factor ($\times 10^{-11}$ $cm^3$ $cm/cm^2$ $sec.^{-1}$ $cmHg^{-1}$) | | | | |
| | | | DSDM-Mt | Liquid rubber | | | 25° C. | 100° C. | (MPa) | (%) | (MPa) |
| *1 | 100 | 50 | 0 | 0 | 0 | 2.6 | 21.2 | 12.1 | 17.0 | 539 | 2.30 |
| *2 | ↑ | 30 | ↑ | ↑ | ↑ | — | 6.2 | 4.5 | 17.3 | 616 | 1.31 |
| *3 | ↑ | 20 | ↑ | ↑ | ↑ | — | 3.3 | 2.6 | 15.9 | 672 | 1.00 |
| *4 | ↑ | 0 | ↑ | ↑ | ↑ | — | 1.4 | 1.2 | 2.4 | 544 | 0.45 |
| 5 | ↑ | 20 | 10 (5) | 10 | ↑ | 1.9 | 9.4 | 3.0 | 18.3 | 893 | 0.81 |
| 6 | ↑ | ↑ | 20 (10) | ↑ | ↑ | 1.7 | 38.5 | 9.1 | 16.7 | 973 | 1.18 |
| 7 | ↑ | ↑ | 30 (15) | ↑ | ↑ | 1.8 | 107.0 | 21.9 | 14.8 | 933 | 1.33 |
| *8 | ↑ | ↑ | 0 | ↑ | 5 | 2.9 | 3.3 | 2.5 | 17.1 | 815 | 0.77 |
| 9 | ↑ | 0 | 10 (5) | ↑ | 0 | — | 4.3 | 2.1 | 16.4 | 835 | 0.71 |
| 10 | ↑ | ↑ | 20 (10) | ↑ | ↑ | — | 25.8 | 4.7 | 16.4 | 866 | 0.87 |
| *11 | ↑ | ↑ | 0 | ↑ | 5 | — | 1.4 | 1.1 | x | x | x |
| *12 | ↑ | ↑ | ↑ | ↑ | 10 | — | 1.6 | 1.2 | 5.7 | 827 | 0.44 |
| *13 | ↑ | 50 | ↑ | ↑ | 0 | — | 17.2 | 10.1 | 17.2 | 670 | 1.68 |
| *14 | ↑ | 30 | ↑ | ↑ | ↑ | 2.9 | 5.4 | 3.8 | 18.2 | 716 | 1.06 |
| *15 | ↑ | 20 | ↑ | ↑ | ↑ | 2.9 | 2.9 | 2.5 | 15.6 | 689 | 0.81 |
| *16 | ↑ | 0 | ↑ | ↑ | ↑ | — | 1.3 | 1.2 | 1.6 | 440 | 0.46 |

*Comparative sample

EXAMPLE 19

In this example, various types of sheets (samples 21 to 26) were produced by changing the compounding ratio of the composite clay rubber material. Each dynamic property of the produced sheets was evaluated.

The composite clay rubber material was prepared by kneading the second composite clay material with the rubber material. In this example, sodium type montmorillonite (produced in yamagata pref.; Ion exchange capacity: 120 meq/100 g) was used as the clay mineral. The oleyl ammonium ion having unsaturated group in th molecule was used as the organic onium ion. As the main guest molecule, polyisoprene having hydroxyl group (produced by Kuraray : LIR 506) was used. The method for producing the composite clay material is described hereinafter.

First 20.0 g of montmorillonite was dispersed in 2000 ml of 80° C. water. Then 8.8 g of hydrochloride of oleylamine was dissolved in 1500 ml of 80° C. water. Each water solution was mixed together to obtain precipitate. The precipitate was washed with 80° C. water twice.

The montmorillonite organized with the oleylammonium ion was thus prepared this is called as OL-montmorillonite. The inorganic content of the OL-montmorillonite measured 69.4 wt. % by ignition loss. The interlayer distance of the OL-montmorillonite measured 22. 5 Å with x-ray diffraction method.

Three kinds of th second composite clay materials were prepared-by mixing 70 g, 140 g and 210 g of the OL-montmorillonite with 100 g of polyisoprene, respectively. The interlayer distance of the montmorillonite of the composite clay material measured 70.0ÅE with x-ray diffraction method.

The composite clay material was mixed and kneaded with 3.0 g of sulfur, 5.0 g of zinc oxide, 3.0 g of stearic acid and 1.5 g of vulcanizing accelerator (OUCHI SHINKO KAGAKU KOGYO CO.: NOCCELER MSAG). The Each dynamic property of the above-prepared samples 21 to 26 was measured in th same manner as described in Example 18. The measurement results are shown in Table 2.

The measurement results of th dynamic properties are shown in Table 10. In the column of the compounding ratio of the OL-montmorillonite, th value in parentheses refers to weight ratio of the montmorillonite and the value left of parentheses refers to the weight ratio of OL-montmorillonite. In the column of the gas permeability factor value, dashed part represents that such factor was not measured.

As Table 10 indicates, samples 24 to 26 using OL-montmorillonite measured excellent dynamic properties compared with the sample 22 using no OL-montmorilonite.

The samples 24 to 26 also measured more improved dynamic properties compared with samples 5 to 7 of Example 18. This is assumed to be attributable to the following reasons.

The polyisoprene as the main guest molecule and oleylammonium ion as the organic onium ion have unsaturated groups in their molecules. Kneading and vulcanizing both materials with the rubber material forms crosslinking among those unsaturated groups. As a result, each interface of the silicate layer of the montmorillonite and butyl rubber is rigidly bonded. This restricts the motion of the rubber molecules in the vicinity of the silicate layer, leading to improved dynamic properties, especially hardness and elastic modulus.

The invention being thus described, it will be obvious that the same may be varied in many ways. Such variations are not to be regarded as a departure form the spirit and scope of the invention, and all such modifications as would be obvious to one skilled in the art are intended to be included within the scope of the following claims.

TABLE 10

| | Composition of composite clay rubber material (wt. %) | | | | Gas permeability factor ($\times 10^{-11}$ | Storage elastic modulus (MPa) | | Tensile strength | Elong- ation | Tensile stress |
|---|---|---|---|---|---|---|---|---|---|---|
| Sample No. | Rubber Material | Carbon | Second composite clay material | | $cm^3 \, cm/cm^2 \, sec.^{-1}$ | | | | | |
| | | | OL-montmorillonite | isoprene | $cmHg^{-1}$) | 25° C. | 100° C. | (MPa) | (%) | (MPa) |
| *21 | 100 | 50 | 0 | 0 | 2.6 | 21.2 | 12.1 | 17.0 | 539 | 2.30 |
| *22 | ↑ | 20 | ↑ | ↑ | — | 3.3 | 2.6 | 15.9 | 672 | 1.00 |
| *23 | ↑ | 0 | ↑ | ↑ | — | 1.4 | 1.2 | 2.4 | 544 | 0.45 |
| 24 | ↑ | 20 | 7 (5) | 10 | 1.7 | 9.6 | 3.1 | 18.6 | 860 | 0.85 |
| 25 | ↑ | ↑ | 14 (10) | ↑ | 1.5 | 39.1 | 9.3 | 17.7 | 920 | 1.21 |
| 26 | ↑ | ↑ | 21 (15) | ↑ | 1.5 | 110.5 | 22.2 | 15.4 | 910 | 1.36 |

*Comparative sample

What is claimed is:

1. A composite clay material, comprising:
   a) a clay mineral having an interlayer section;
   b) an onium ion having 6 or more carbon atoms, bonding to said clay mineral via an ionic bond for expanding the interlayer section and rendering the interlayer section compatible with an organic molecule; and
   c) a main guest molecule as said organic molecule having a polar group in a main chain or a side chain thereof or both being at least partially incorporated into said expanded interlayer section and bonded to said clay mineral through a hydrogen bonding between said clay mineral and said polar group, said main guest molecule having a molecular length equal to or larger than that of said organic onium ion; and
   wherein said main guest molecule is an olefin or a paraffin.

2. The composite clay material of claim 1, wherein said olefin or said paraffin is a straight chain or a branched chain olefin or paraffin, or is a straight chain or a branched chain olefin or paraffin having an aromatic ring in said main chain or side chain or both thereof.

3. The composite clay material of claim 1, wherein said polar group is at least one selected from the group consisting of hydroxyl, halogen, carboxyl, anhydrous carboxylic acid, thiol, epoxy and amino group.

4. The composite clay material of claim 1, wherein 10 wt. % of a total molecular weight of said main guest molecule is incorporated into said interlayer section of said clay material.

5. The composite clay material of claim 1, wherein a molecular weight of the main guest molecule ranges from about 100 to about 100,000.

6. The composite clay material of claim 1, wherein said clay mineral has a cation exchange capacity of about 50 to 200 milli equivalent weight /100 g.

7. The composite clay material of claim 6, which is natural or synthetic.

8. The composite clay material of claim 1, which is montmorillonite.

9. The composite clay material of claim 1, wherein said onium ion is selected from the group consisting of organic ammonium, sulfonium and phosphonium ions.

10. The composite clay material of claim 1, wherein said onium ion is an organic ammonium ion selected from the group consisting of hexylammonium ion, octadecylammonium ion, dioctyldimethylammonium ion, trioctylammonium ion, distearyldimethylammonium ion, lauric acid ammonium ion, octylammonium ion, 2-ethylhexylammonium ion, dodecylammonium ion, 1-hexenylammonium ion, 9-dodecenylammonium ion, 9-octadecenylammonium, 9,12-octadecadienylammonium ion and 9,12,15-octadecatrienylammonium ion.

11. A blend material from said composite clay material of claim 1, wherein said composite clay material is mixed with a synthetic resin other than said organic onium ion or said main guest molecule.

12. The composite clay material of claim 1, further comprising a rubber material, wherein a molecule of the rubber material is crosslinked with said main guest molecule.

13. The composite clay material of claim 12, wherein said polar group of said main guest molecule is at least one selected from the group consisting of hydroxyl, halogen, carboxyl, anhydrous carboxylic acid, thiol, epoxy and amino group.

14. The composite clay material of claim 12, wherein the molecular weight of said main guest molecule ranges from about 100 to about 100,000.

15. The composite clay material of claim 12, wherein 10 wt. % or more of the total molecular weight of the main guest molecule is incorporated in said interlayer section of said clay mineral.

16. The composite clay material as claimed in claim 12, wherein said rubber material is at least one selected from the group consisting of natural rubber, isoprene rubber, chloroprene rubber, styrene rubber, nitrile rubber, ethylene-propylene rubber, ethylene-propylenediene rubber, butadiene rubber, styrene-butadiene rubber, butyl rubber, epichlorohydrene rubber, acrylic rubber, urethane rubber, fluoro rubber and silicon rubber.

17. A method for producing a composite clay material, comprising:
   a) incorporating an organic onium ion into an interlayer section of a clay mineral by contacting the onium ion with said clay mineral and forming an ionic bond therebetween for expanding the interlayer section and rendering the interlayer section compatible with an organic molecule, the organic onium ion having 6 or more carbon atoms;
   b) contacting the rendered interlayer section of the clay mineral with a main guest molecule having a polar group in a main chain or a side chain thereof and a molecular length equal to or larger than that of said organic onium ion, and forming a hydrogen bond therebetween so that the main guest molecule is at least partially incorporated into said rendered interlayer section of the clay mineral; and wherein said contacting step is carried out by adding said clay mineral having said rendered interlayer section into a solvent containing said main guest molecule or by adding said clay mineral into said main guest molecule in a softened or molten state.

18. The method of claim 17, wherein said main guest molecule contains an unsaturated group, and said contacting step is followed by kneading said composite clay material and a rubber material; and crosslinking said unsaturated group of said main guest molecule and said rubber molecule.

* * * * *